Figure 1:
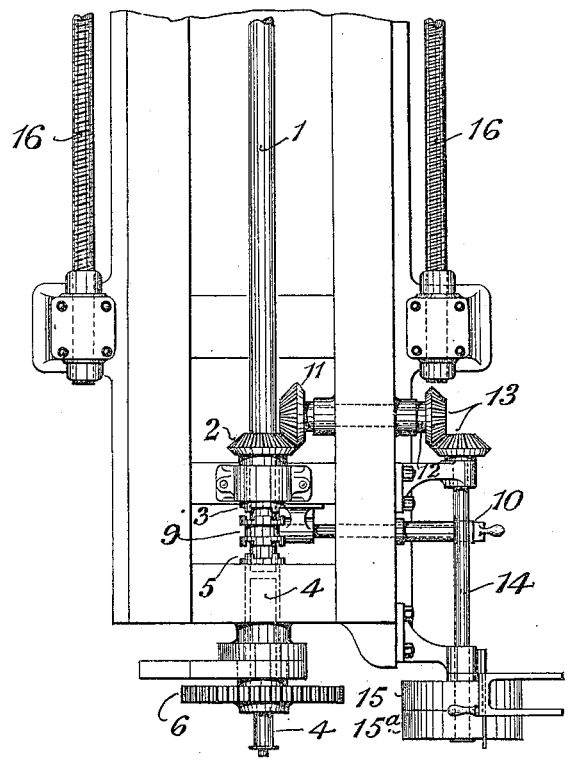

No. 621,322. Patented Mar. 21, 1899.
W. W. HULSE, Dec'd.
C. M. CATLIN, Administrator.
LATHE.
(Application filed Dec. 31, 1897.)

(No Model.) 6 Sheets—Sheet 1.

Witnesses:
H. C. Pinckney
Pennington Halsted

Charles M. Catlin
Administrator of the Estate of William Wilson Hulse, deceased,
Inventor.
By J. E. M. Bowen
Attorney.

No. 621,322. Patented Mar. 21, 1899.
W. W. HULSE, Dec'd.
C. M. CATLIN, Administrator.
LATHE.
(Application filed Dec. 31, 1897.)
(No Model.) 6 Sheets—Sheet 2.
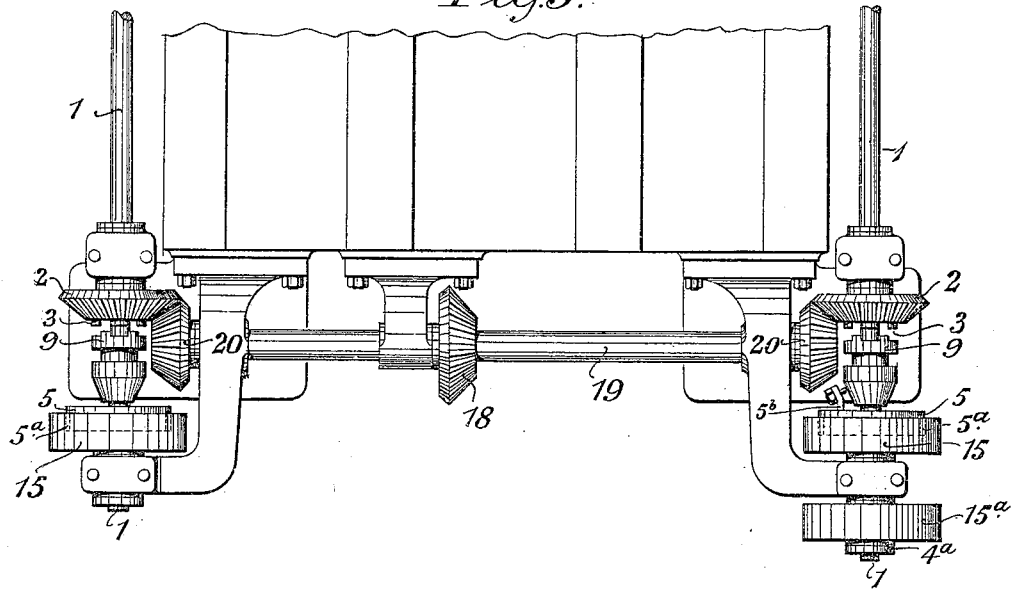
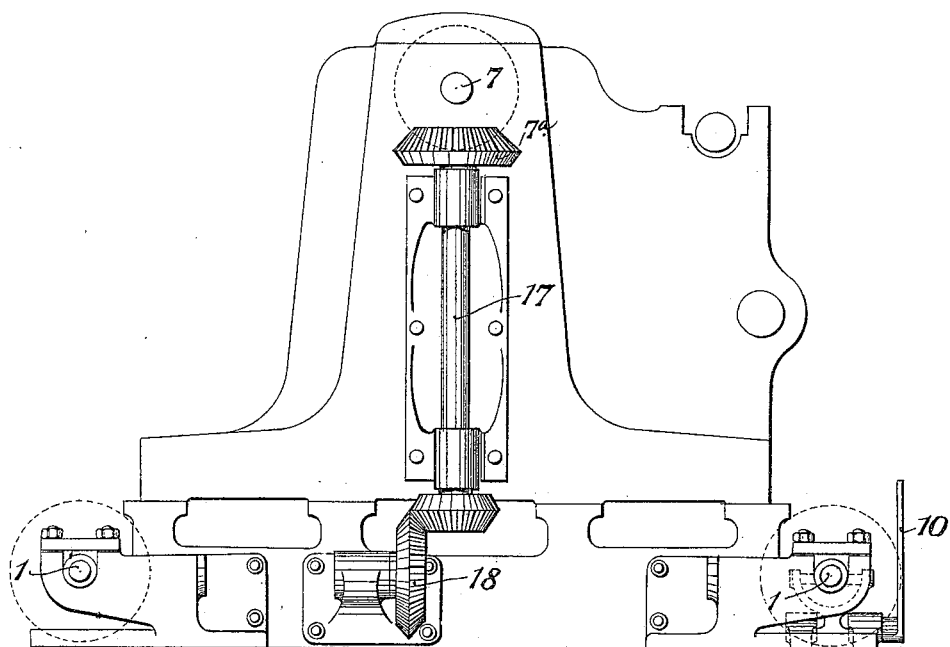

No. 621,322. Patented Mar. 21, 1899.
W. W. HULSE, Dec'd.
C. M. CATLIN, Administrator.
LATHE.
(Application filed Dec. 31, 1897.)
(No Model.) 6 Sheets—Sheet 3.
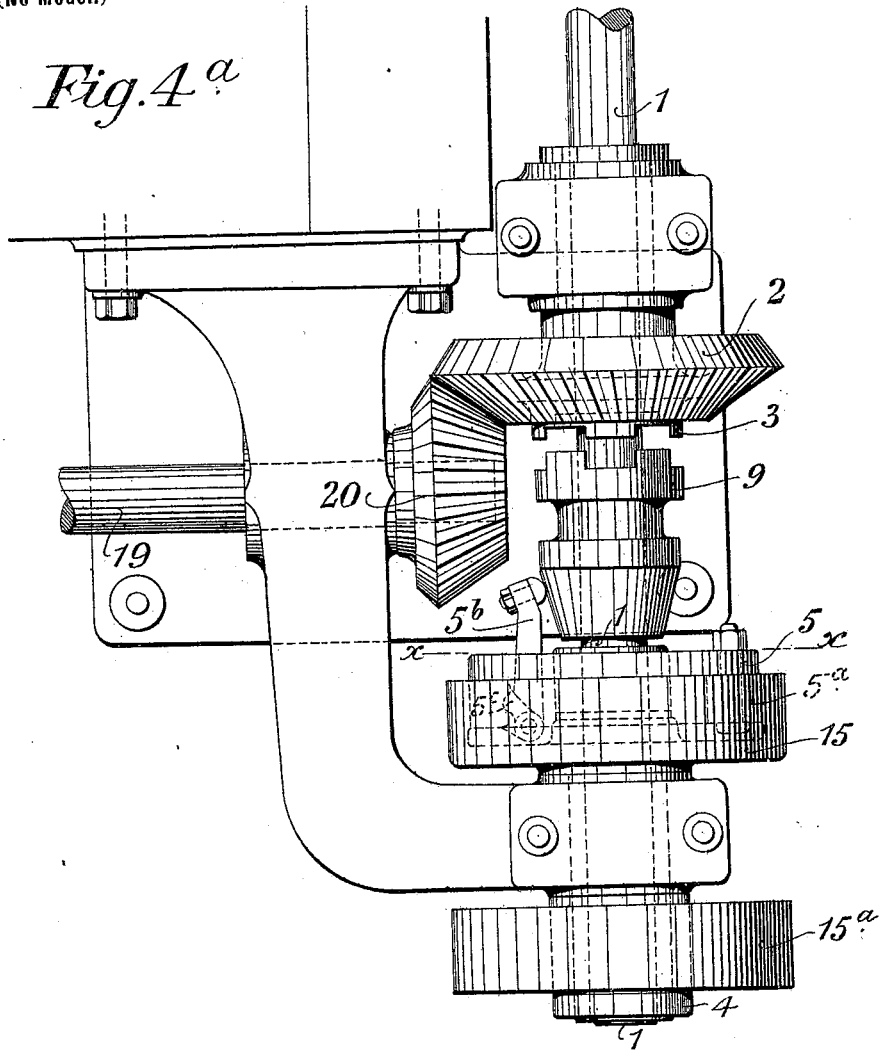
Fig. 4ª
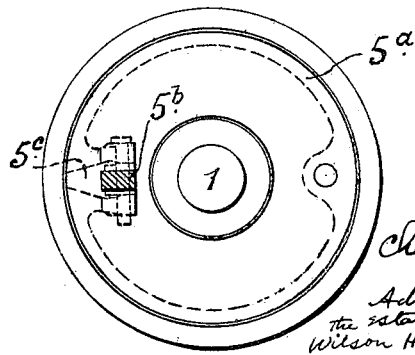
Fig. 4ᵇ
Witnesses:
M. C. Pinckney
Pennington Halsted
Charles M. Catlin
Administrator to the estate of William Wilson Hulse, deceased,
Inventor:
By J. E. M. Bowen
Attorney.

No. 621,322. Patented Mar. 21, 1899.
W. W. HULSE, Dec'd.
C. M. CATLIN, Administrator.
LATHE.
(Application filed Dec. 31, 1897.)
(No Model.) 6 Sheets—Sheet 4.

Witnesses:
W. C. Pinckney
Pennington Halsted

Charles M. Catlin
Administrator to the estate of
William Wilson Hulse
Inventor
By J. E. M. Bowen
Attorney No. 621,322. Patented Mar. 21, 1899.
W. W. HULSE, Dec'd.
C. M. CATLIN, Administrator.
LATHE.
(Application filed Dec. 31, 1897.)
(No Model.) 6 Sheets—Sheet 5.

Witnesses:
M. C. Pinckney
Pennington Halsted

Charles M. Catlin
Administrator to the estate
of William Wilson Hulse.
Inventor.
By J. E. M. Bower
Attorney.

THE NORRIS PETERS CO., PHOTO-LITHO., WASHINGTON, D. C.

No. 621,322. Patented Mar. 21, 1899.
W. W. HULSE, Dec'd.
C. M. CATLIN, Administrator.
LATHE.
(Application filed Dec. 31, 1897.)
(No Model.) 6 Sheets—Sheet 3.
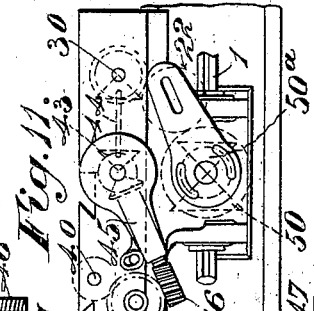
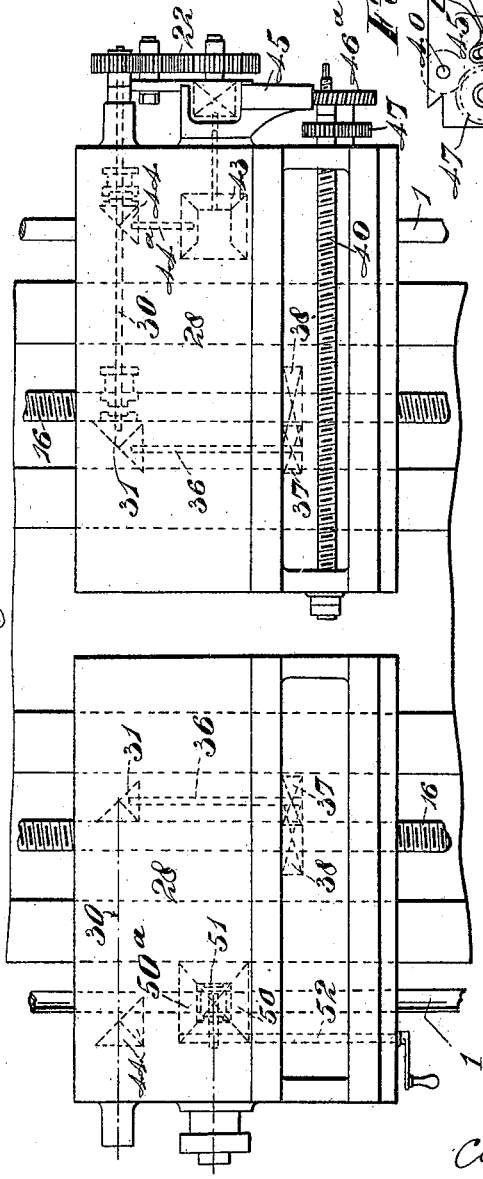
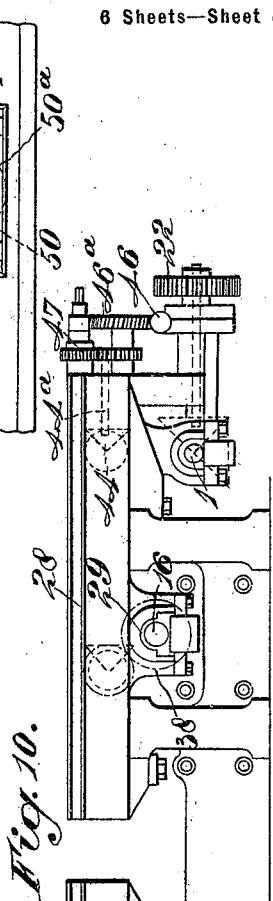
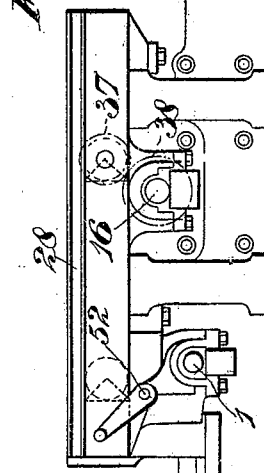

UNITED STATES PATENT OFFICE.

CHARLES M. CATLIN, OF WASHINGTON, DISTRICT OF COLUMBIA, ADMINISTRATOR OF WILLIAM WILSON HULSE, DECEASED, ASSIGNOR TO THE HULSE & COMPANY, LIMITED, OF SALFORD, ENGLAND.

LATHE.

SPECIFICATION forming part of Letters Patent No. 621,322, dated March 21, 1899.

Application filed December 31, 1897. Serial No. 665,148. (No model.)

*To all whom it may concern:*

Be it known that WILLIAM WILSON HULSE, engineer, who was a subject of the Queen of Great Britain and Ireland, and a resident of Withington, in the county of Lancaster, England, now deceased, (CHARLES M. CATLIN, of the city of Washington, District of Columbia, administrator,) did invent certain new and useful Improvements in Lathes, (for which Letters Patent were obtained in Great Britain, No. 11,088, dated June 7, 1894,) of which invention the following is a full, clear, and exact specification.

This invention has reference to metal-cutting lathes of the kind in which the carriages upon which the slide-rests are mounted are each moved longitudinally on the lathe-bed by a nut or nuts arranged to work on a fixed longitudinal screw or screws and mounted in the carriage so as to have no endwise motion therein, rotary motion being imparted to the said nut or nuts through toothed wheels and shafts from a long rotary shaft arranged parallel to the screw or screws and driven from the lathe-spindle through suitable change-wheels, a clutch being provided in connection with the said toothed wheels and shaft, by means of which the two nuts may be set in motion or have their motion reversed in direction or suspended while the long shaft is running continuously in one direction.

Now this invention has reference to improvements in lathes of the kind referred to, as will now be described with reference to the accompanying drawings, wherein—

Figure 2:
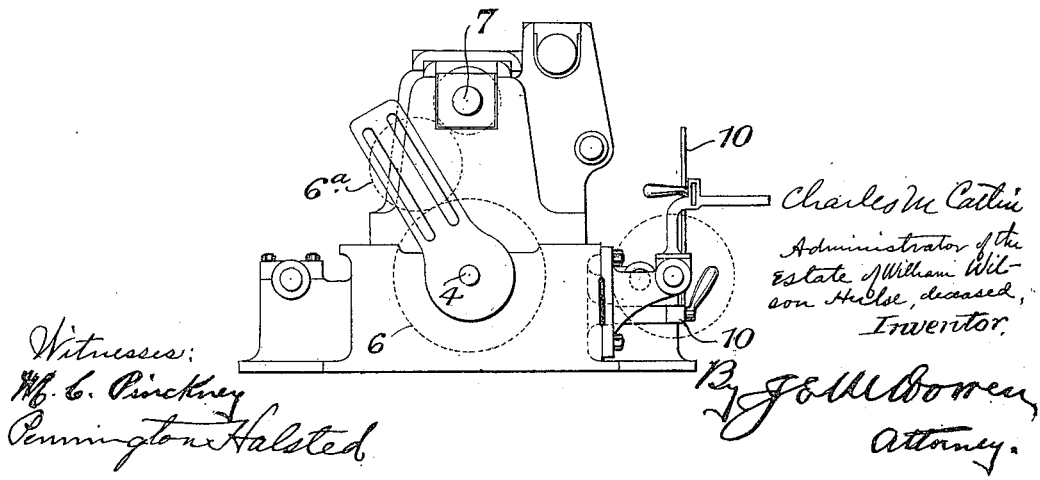
Figure 5:
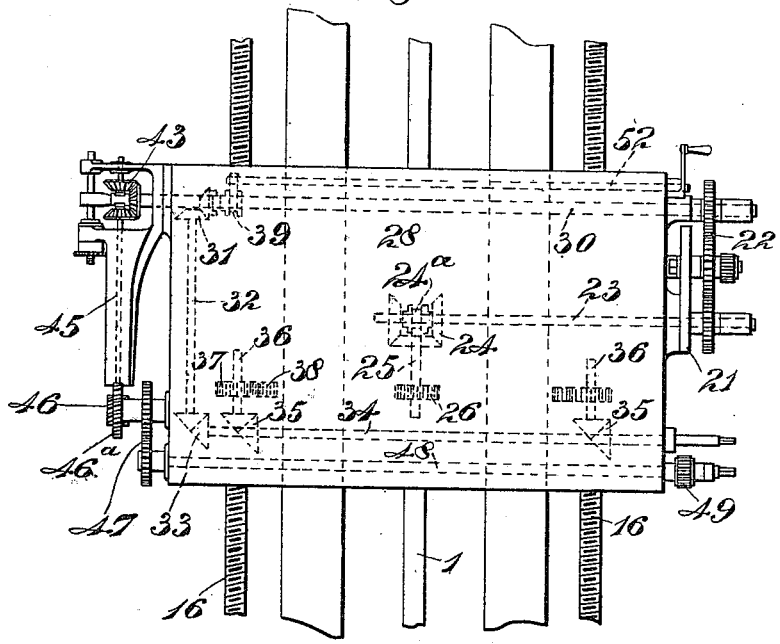
Figure 6:
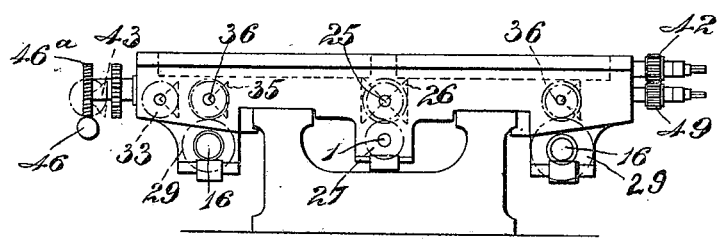
Figure 7:
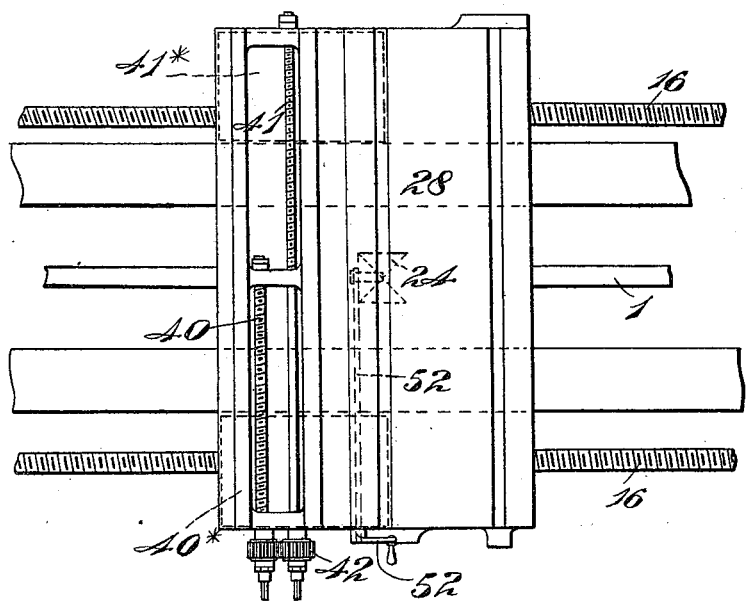
Figure 8:
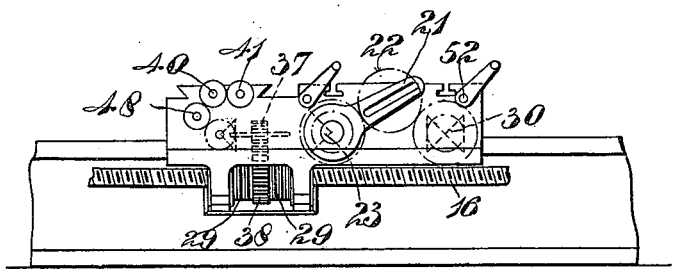

Figure 1 is a plan, and Fig. 2 an end elevation, showing so much of a lathe as is necessary to illustrate the application thereto of driving mechanism according to this invention. Figs. 3 and 4 are similar views to Figs. 1 and 2, respectively, showing a modification; and Fig. 4ᵃ is an enlarged detail view of part thereof. Fig. 4ᵇ is a horizontal section on the line x x of Fig. 4ᵃ. Figs. 5, 6, 7, and 8 are respectively a plan, a cross-section, a part plan, and a side elevation showing part of a lathe bed and carriage, with an arrangement of mechanism for traversing the slide-rests and carriages of a lathe. Figs. 9, 10, and 11 are respectively a plan, a cross-section, and a side elevation showing part of a double-bedded lathe provided with two longitudinal rotary shafts for operating the carriages thereof.

In lathes for cutting metals according to this invention in order that the long rotary shaft, or each of such shafts when there are two, may be driven at a slow speed at one time—as, for instance, when the cutting-tools are in action—and at a quick speed at other times—as, for instance, when returning the carriages into position for recommencing a fresh cut—there is employed special driving mechanism, one arrangement of which is shown in Figs. 1 and 2 of the accompanying drawings. In this example 1 is the long rotary shaft, which is to be rotated at one time at a slow speed and at another time at a quick speed. For this purpose there is loosely mounted upon one end of it a toothed wheel 2 (or pulley) with part clutch 3, adapted to be rotated at a quick speed, and beyond the end of, but in line with, the said shaft is a short shaft 4, on which is keyed a part clutch 5, to the outer end of which is keyed a change-wheel 6, that is adapted to be rotated at a comparatively slow speed from the lathe-spindle 7 through suitable gearing 6ᵃ, as well understood. Feathered upon the long rotary shaft 1 is a double-ended clutch 9, that can be engaged with either the part clutch 3 or with the part clutch 5 or disconnected from both at will, according as it is required to rotate the said shaft quickly or slowly or to bring it to rest. The operation of the clutch 9 may be effected through any suitable means, such as a lever 10, connected, it may be, with a rod (not shown) extending longitudinally of the lathe. The toothed wheel 2 may conveniently be driven at a quick speed by a toothed wheel 11, fixed upon a transverse shaft 12, which is rotated by bevel-gearing 13 from a longitudinal shaft 14, provided with fast and loose pulleys 15 and 15ᵃ, respectively. 16 are the aforesaid fixed longitudinal screws.

Figs. 3 and 4 show part of a lathe provided with a long rotary shaft 1 at each side thereof. In this arrangement the toothed wheel 2, with part clutch 3 loosely mounted on each rotary shaft 1, is arranged to be driven at a slow speed from the lathe-spindle 7 by bevel-gearing 7ª, vertical shaft 17, bevel-gearing 18, horizontal shaft 19, and bevel-wheel 20, which is constantly in gear with the corresponding bevel-wheel 2. The part clutch corresponding to 5 in Figs. 1 and 2 comprises in this arrangement a ring 5ª, that is carried by a disk 5, keyed to the shaft 1, and is adapted to be expanded by means of a lever 5ᵇ and wedge 5ᶜ, Figs. 4ª and 4ᵇ, so as to engage the inner surface of the rapidly-driven pulley 15 in a manner well understood. 9 is the double-ended clutch, feathered to the shaft 1 and having one end formed as a jaw-clutch to engage the correspondingly-formed clutch part 3 and its other end formed as a cone for operating the lever and wedge and expanding the ring 5ª within the pulley 15. The two pulleys 15 may each be driven separately or be connected together by a belt, motion being directly imparted to one of them by a belt-driving pulley 15ª, which is keyed on the elongated boss 4ª of pulley 15, which revolves freely on shaft 1.

In order that the slide-rests and carriages of a lathe provided with a rotary shaft or shafts 1, operated as hereinbefore described, may be traversed at different speeds independently of each other to suit requirement, each carriage is provided with a swing plate or frame carrying change-wheels which are driven through suitable toothed wheels and a shaft or shafts from the longitudinal rotary shaft and which can be used alternately for driving the nut or nuts mounted in the carriage and the transverse traversing screw or screws of the slide rest or rests, as may be required.

Figs. 5, 6, 7, and 8 show part of a lathe bed and carriage with an arrangement of mechanism such as just referred to. 21 is the swing-plate carrying the change-wheels 22, which are driven through a transverse shaft 23, bevel reversing-gear 24, short longitudinal shaft 25, and toothed wheel 26 from a toothed wheel 27, mounted on the carriage 28, but feathered to the rotary shaft 1, so as to be driven thereby, while free to slide lengthwise thereon. 24ª is a clutch combined with the bevel-gear 24 in a known way, so that the motion can be changed in direction or arrested at will. The carriage 28 is shown provided with two rotary nuts 29, which work onto two fixed longitudinal screws 16 and are driven from the change-wheels 22 through a cross-shaft 30, bevel-gear 31, longitudinal shaft 32, bevel-gearing 33, transverse shaft 34, and two sets of bevel-gearing 35, each driving a longitudinal shaft 36, provided with a toothed wheel 37 in gear with a toothed wheel 38, carried by the corresponding nut 29. 39 is a clutch by which the shafts 30 and 32 can be connected to and disconnected from each other. 40 and 41 are transverse screws whereby one or each of two slide-rests (indicated by dotted lines in Fig. 7 at 40ˣ and 41ˣ, respectively) can be moved crosswise upon the carriage 28. These screws are geared together at 42 so as to rotate in opposite directions, and one of them—viz., 40—is driven from the shaft 30 through mechanism comprising bevel-gearing and a reversing-clutch of ordinary construction at 43, carried by a swinging frame 45 and driven from the said shaft 30, a worm 46, driven from said bevel-gearing, a worm-wheel 46ª, toothed wheels 47, and a transverse shaft 48, which carries a toothed pinion 49 in gear with the toothed pinion on screw 40. This arrangement is specially advantageous when it is desired to move the cutter or cutters at right angles to the axis of the lathe simultaneously with the longitudinal movement of the corresponding carriage 28 for turning taper-work at different angles, or other known or suitable arrangements may be employed for actuating the slide rest or rests transversely from the cross-shaft 30, while the carriage 28, upon which it or they are mounted, is moving longitudinally.

In the case of lathes, such as double-bedded lathes, in which the carriages 28 are each moved longitudinally by a single nut, the longitudinal rotary shaft 1, or each of them when there are two, may be arranged outside the lathe-bed, as shown in Figs. 9, 10, and 11, which are respectively a plan, cross-section, and side elevation of part of a double-bedded lathe provided with two such shafts. In this case motion is transmitted from each shaft to the change-wheels 22 through one or the other of two bevel-wheels 50 50ª, mounted to rotate and slide endwise upon the said shaft, to which either of the said wheels can be connected by a double clutch 51. Each rotary nut 29 may be driven through toothed wheels 38 37, longitudinal shaft 36, and bevel-gear 31 from a cross-shaft 30, as in the preceding arrangement, the said cross-shaft being in turn driven from the change-wheels 22. For taper-turning gearing similar to that shown in Figs. 5 to 8, inclusive, is provided in connection with the transverse traversing screw 40 on each carriage 28. This gearing comprises bevel-gear 44, driven by the cross-shaft 30, a shaft 44ª, bevel-gear 43, worm 46, carried by the swinging frame 45, worm-wheel 46ª, and toothed wheel 47, which is in gear with a toothed wheel on the screw. The long rotary shaft 1, or each of such shafts when there are two, as in the arrangement now being described, may be driven at a slow speed at one time and at a quick speed at other times by driving mechanism constructed and arranged as hereinbefore described with reference, respectively, to and shown in Figs. 1 and 2 and in Figs. 3 and 4.

The clutches used in the arrangements shown in Figs. 5 to 11, inclusive, are each operated by a shaft, such as 52, Fig. 9, provided with a crank-handle.

What is claimed is—

1. In a lathe of the kind herein referred to, the combination with the rotary driving-shaft extending longitudinally of the lathe-bed, of driving mechanism comprising two driving-wheels adapted to be driven at different speeds and a clutch device adapted when moved in one direction to clutch said rotary shaft with one of said driving-wheels, when moved in the opposite direction to clutch said shaft with the other of said driving-wheels, and when moved into an intermediate position to disengage said shaft from each of said driving-wheels, substantially as described.

2. In a lathe of the kind herein described, the combination with the lathe-spindle and the longitudinal rotary driving-shaft of two toothed wheels mounted to rotate about an axis in line with that of said shaft mechanism arranged to drive one of said toothed wheels from said lathe-spindle, means for driving the other toothed wheel independently of said lathe-spindle and at a different velocity to the first toothed wheel, and clutch mechanism arranged between and coaxial with said toothed wheel and whereby said shaft can be thrown at will into or out of gear with either of said toothed wheels, substantially as described.

3. In a lathe of the kind herein referred to, the combination with the longitudinal driving-shaft 1 and lathe-spindle 7, of the toothed wheel 2 with part clutch 3 mounted to turn freely on said shaft, a driving-shaft 14 arranged parallel with said shaft 1 and provided with fast and loose pulleys, driving mechanism connecting said toothed wheel 2 to said shaft 14, a shaft 4 coaxial with but independent of said shaft 1, a toothed wheel with part clutch 5 mounted to turn freely on said shaft 4, driving mechanism connecting said lathe-spindle with said wheel 6, a part clutch 9 feathered to said shaft 1 and able to slide endwise thereon, and means for moving said part clutch 9 into and out of gear with each of said part clutches 3 and 5 alternately, substantially as described for the purpose specified.

4. In a lathe of the kind herein described, the combination with the lathe-bed, a fixed screw, extending longitudinally thereof, a carriage with slide-rest mounted to travel on said bed and provided with a rotary nut engaging said screw, and a longitudinal rotary driving-shaft, of two shafts 23 and 30 mounted on said carriage, reversing mechanism mounted on said carriage, arranged to be driven from said rotary shaft and to drive said shaft 23, a clutch device for throwing said reversing mechanism in and out of action, change-gear connecting said shafts 23 and 30, driving mechanism carried by said carriage and arranged to drive said rotary nut from said shaft 30, and a clutch for throwing said driving mechanism in and out of action, substantially as described.

5. In a lathe of the kind herein described, the combination with the lathe-bed, a fixed screw, extending longitudinally thereof, a carriage with slide-rest mounted to travel on said bed and provided with a rotary nut engaging said screw, a longitudinal rotary driving-shaft, and a transverse screw journaled in said carriage and adapted for traversing a slide-rest thereon, of two shafts 23 and 30 mounted on said carriage, reversing mechanism mounted on said carriage arranged to be driven from said rotary shaft and to drive said shaft 23, a clutch device for throwing said reversing mechanism in and out of action, change-gear connecting said shafts 23 and 30, driving mechanism carried by said carriage and arranged to drive said rotary nut from said shaft 30, a clutch for throwing said driving mechanism in and out of action, a frame 45 mounted to swing on said carriage, reversing-gear carried by said swinging frame and driven from said shaft 30, a clutch for throwing this reversing-gear in and out of action, a worm carried by said frame and driven from the reversing-gear carried thereby, and a worm-wheel in gear with said worm, mounted on said carriage, and connected with said traversing screw, substantially as described.

6. In a lathe, the combination of the lathe-bed, fixed longitudinal screw or screws 16, longitudinal rotary shaft 1, carriage 28, and longitudinal traversing mechanism mounted on said carriage and comprising three parallel shafts 23, 30, and 34, change-gear 22 connecting said shafts 23 and 30, reversing mechanism 24 driven from said rotary shaft and adapted to drive said shaft 23, a clutch 24ª for throwing said reversing mechanism in and out of gear, a longitudinal shaft 32 with bevel-gearing 31 and 32 for connecting said shafts 30 and 34, a clutch 39 for throwing said shaft 32 in and out of gear with said shaft 30, a rotary nut or rotary nuts engaging said longitudinal screw or screws, and driving mechanism between said shaft 34 and said nut or each nut, substantially as described.

Signed in the city of Washington, in the District of Columbia, this 31st day of December, 1897, in the presence of two subscribing witnesses.

CHARLES M. CATLIN,
*Administrator of the estate of William Wilson Hulse, deceased.*

Witnesses:
BENJ. R. CATLIN,
F. D. BLACKISTONE.